US012705234B2

(12) United States Patent
Ke et al.

(10) Patent No.: US 12,705,234 B2
(45) Date of Patent: Aug. 11, 2026

(54) INSTRUCTION QUERY METHOD, COMPUTER PROGRAM PRODUCT AND ASSOCIATED QUERY SYSTEM

(71) Applicant: Acer Incorporated, New Taipei City (TW)

(72) Inventors: Chen-Wei Ke, New Taipei City (TW); Liang-Chi Chen, New Taipei City (TW); Kuan-Ju Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 0 days.

(21) Appl. No.: 18/974,103

(22) Filed: Dec. 9, 2024

(65) Prior Publication Data

US 2025/0217357 A1 Jul. 3, 2025

(30) Foreign Application Priority Data

Jan. 3, 2024 (TW) ................................ 113100294

(51) Int. Cl.
*G06F 16/2452* (2019.01)

(52) U.S. Cl.
CPC .............................. *G06F 16/24522* (2019.01)

(58) Field of Classification Search
CPC ....................... G06F 16/24522; G06F 16/3329
See application file for complete search history.

(56) References Cited

U.S. PATENT DOCUMENTS 12,405,982 B2 * 9/2025 Kundel ............... G06F 16/3344
2022/0237232 A1 * 7/2022 Quamar .............. G06F 16/2465
2023/0376836 A1 * 11/2023 Komarek ............ H04L 63/1441

FOREIGN PATENT DOCUMENTS

CN 113312453 A 8/2021
CN 117313751 A * 12/2023 ............ G06F 40/58
WO WO-2024015321 A1 * 1/2024 ............ G06N 5/022

OTHER PUBLICATIONS

Shen, Is Translation Helpful? An Empirical Analysis of Cross-Lingual Transfer in Low-Resource Dialog Generation, pp. 1-8, May 2023.*

* cited by examiner

*Primary Examiner* — Albert M Phillips, III
(74) *Attorney, Agent, or Firm* — Birch, Stewart, Kolasch & Birch, LLP

(57) ABSTRACT

An instruction query method, a computer program product, and an associated query system are provided. A software program is stored in the computer program product, and the software program performs the instruction query method. The instruction query method includes the following steps. Firstly, a language translator translates a non-English query string into an English query string according to a language identification code. Then, a prompt tuning module transforms the English query string into an English interactive prompt string according to at least one high-relevance token vector. The at least one high-relevance token vector relates to the operating instructions of an electronic device. Afterward, the language translator translates an English reply string into a non-English reply string according to the language identification code. The English reply string is generated based on inferences made from the English interactive prompt string.

9 Claims, 6 Drawing Sheets

INSTRUCTION QUERY METHOD, COMPUTER PROGRAM PRODUCT AND ASSOCIATED QUERY SYSTEM

This application claims the benefit of Taiwan application Serial No. 113100294, filed Jan. 3, 2024, the disclosure of which is incorporated by reference herein in its entirety.

TECHNICAL FIELD

The disclosure relates in general to an instruction query method, a computer program product and an associated query system, and more particularly to an instruction query method, a computer program product and an associated query system which respond to the user in the user's familiar language.

BACKGROUND

Recently, the use of artificial intelligence (AI) for information query becomes increasing popular. Through generative pre-trained transformers (GPT), answers can be quickly obtained even though it used to take much time to search for related data. For example, ChatGPT can be trained with a large amount of data collected from the Internet by utilizing deep learning techniques, and thus can have conversations with users. Another example is that Microsoft Copilot can help users in dealing with relatively general problems or problems of upper-layer application software. For instance, Copilot in Outlook can draft emails, and Copilot in Word can generate copywritings.

The existing AI tools, Including ChatGPT and Copilot, developed based on large language models (LLM) are set in the cloud. For users, this means that the query efficiency depends on the network bandwidth. Furthermore, the current AI tools are associated with broad but rough data sources. If a user wants to ask more specific questions, these AI tools are still unable to accurately provide or respond with more accurate information.

At present, many electronic products have more and more functions. The users are likely to encounter unfamiliar or unknown functions and have no knowledge of how to start or set the functions. Unfortunately, the current AI tools can only reply with relatively vague messages. When a user asks for operating instructions related to the electronic product close at hand, the current AI tools may even cause hallucination. Therefore, the current AI tools still cannot help users to quickly and accurately obtain information for operating or setting the electronic products.

SUMMARY

The disclosure is directed to an instruction query method, a computer program product and an associated query system. The instruction query method applied to the query system involves functions of language translation and interaction, and improves the interactivity based on a user manual in English version of the electronic device, thus helping the user in querying the operating instructions related to the electronic device.

According to one embodiment, an instruction query method is provided. The instruction query method includes the following steps. At first, a language translator translates a non-English query string into an English query string according to a language identification code. Then, a prompt tuning module transforms the English query string into an English interactive prompt string according to at least one high-relevance token vector. The at least one high-relevance token vector relates to operating instructions of an electronic device. Afterward, the language translator translates an English reply string into a non-English reply string according to the language identification code. The English reply string is generated based on the inferences made from the English interactive prompt string.

According to another embodiment, a computer program product storing therein a software program is provided. The software program performs an instruction query method, including the follow steps. At first, a non-English query string is translated into an English query string according to a language identification code. Then, the English query string is transformed into an English interactive prompt string according to at least one high-relevance token vector. The at least one high-relevance token vector relates to operating instructions of an electronic device. Afterward, an English reply string is translated into a non-English reply string according to the language identification code. The English reply string is generated based on the inferences made from the English interactive prompt string.

According to an alternative embodiment, an instruction query system is provided. The instruction query system includes a query platform. The query platform includes a language translator and a semantic kernel module. The language translator includes an input translation model and an output translation model. The input translation model translates a non-English query string into an English query string according to a language identification code. The semantic kernel module transforms the English query string into an English interactive prompt string according at least one high-relevance token vector. The at least one high-relevance token vector relates to operating instructions of an electronic device. The output translation model translates an English reply string into a non-English reply string according to the language identification code. The English reply string is generated based on the inferences made from the English interactive prompt string.

Figure 1:
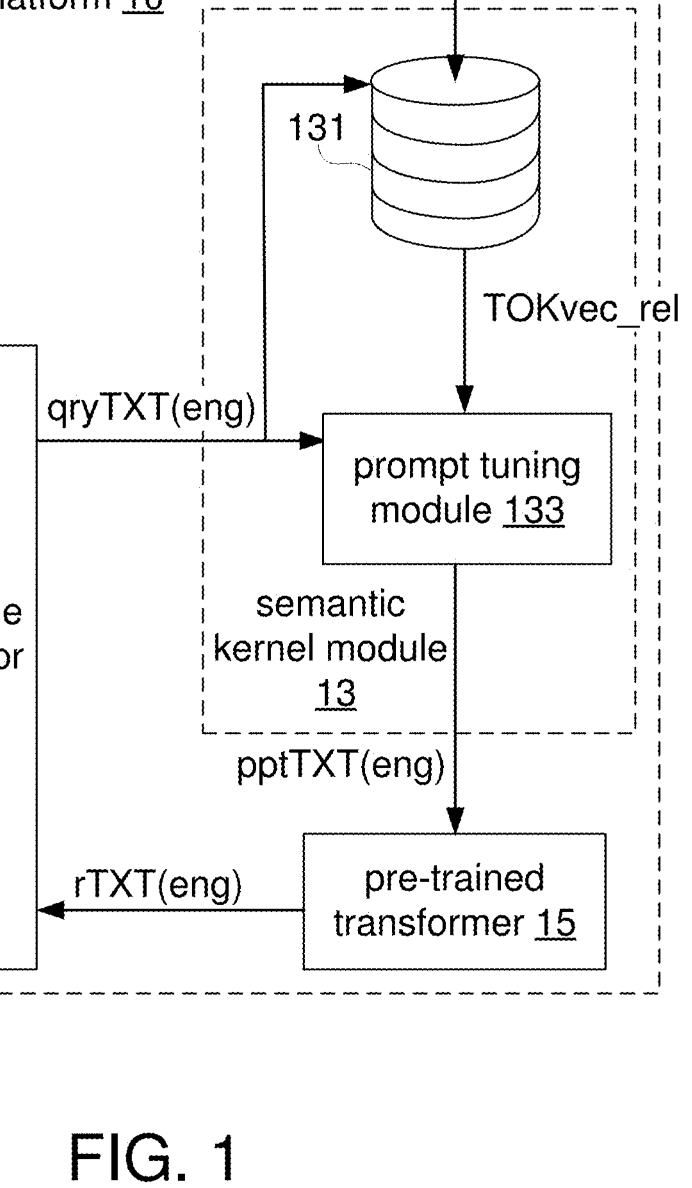
FIG. 1 is a functional block diagram illustrating an instruction query system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present disclosure provides an instruction query system, as shown in FIG. 1, to assist users who are unfamiliar with the functions of an electronic device in quickly and accurately querying operating instructions. The instruction query system of the present disclosure responds to the user queries based on the user manual (English version) of the electronic device so that the users can obtain the operating instructions related to the current electronic device efficiently. Furthermore, the instruction query system of the present disclosure provides a language translation function so that users unfamiliar with English can query the operating instructions in the user's familiar language (user language usrLNG).

Please refer to FIG. 1, which is a functional block diagram illustrating an instruction query system according to the present disclosure. The instruction query system 1 includes a semantic parser 18*c*, a word vector model 18*g*, and a query platform 10. The semantic parser 18*c* and the word vector model 18*g* are in signal communication with or electrically connected to each other. The word vector model 18*g* is in signal communication with the query platform 10.

The manufacturer of a specific electronic device usually provides an English user manual 18*a* to assist users in operating the electronic device. The English user manual 18*a* fully explains the instructions and the usage/operation of the electronic device. Before the electronic device leaves the factory, the manufacturer uses the semantic parser 18*c* to perform parsing (syntax analysis) on the content of the English user manual 18*a* (including various operating instructions related to the electronic device) in advance.

After the parsing performed by the semantic parser 18*c*, the parsing result is stored as JavaScript Object Notation (JSON) files (Jfile) 18*e*. Afterward, the word vector model 18*g* performs vector calculation and reformatting for the JSON files (Jfile) 18*e* to generate pre-stored token vectors TOKvec and stores them in a vector database 131. The query platform 10 may be completely built into the electronic device, completely set on a server in signal communication with the electronic device, or provided by the electronic device and a server together.

The query platform 10 further includes a language translator 11, a semantic kernel module 13, and a pre-trained transformer 15. The semantic kernel module 13 further includes a vector database 131 and a prompt tuning module 133.

The vector database 131 is configured to enhance the storage efficiency and the search for the pre-stored token vectors TOKvec. The pre-stored token vectors TOKvec stored in the vector database 131 are high-dimensional vectors. Each pre-stored token vector TOKvec represents a characteristic or attribute of a piece of data in the English user manual 18*a*. Before the pre-stored token vectors TOKvec are stored in the vector database 131, the data in the JSON files (Jfile) 18*e* are processed based on the vector format. That is, after the semantic parser 18*c* generates the JSON files (Jfile) 18*e*, the word vector model 18*g* is needed to transform the tokens in the JSON files (Jfile) 18*e* into the pre-stored token vectors TOKvec.

The semantic parser 18*c* includes a tokenizer, an English lexical database, a small language model created by artificial neural networks, etc. The tokenizer is used for splitting texts of the English user manual 18*a* into smaller and more understandable tokens.

The details of how the semantic parser 18*c* performs sentence decomposition and token splitting and how the word vector model 18*g* performs data vectorization will not be described herein. The processes of token splitting and data vectorization for non-English languages are usually much more complicated than those processes for English. Therefore, the query platform 10 of the present disclosure further includes the language translator 11 so that the vector database 131 can just consider the pre-stored token vectors TOKvec based on English. Accordingly, the semantic parser 18*c* and the word vector model 18*g* of the present disclosure perform the parsing and data vectorization only on the English user manual 18*a*, but not other language versions of the user manual. Thus, the semantic parser 18*c* and the word vector model 18*g* of the present disclosure can have a much higher processing speed.

The vector database 131 records the word embeddings (vector values) of the pre-stored token vectors TOKvec, the content of the JSON files (Jfile) 18*e*, and the token number of the pre-stored token vectors TOKvec. The present disclosure does not specify the operation of the word vector model 18*g* and the creation of the vector database 131, including how to create a vector index, how to determine fields in the vector index, vector data types, algorithms for calculating similarity between vectors, and so on. Briefly, after the data vectorization performed by the word vector model 18*g*, the pre-stored token vectors TOKvec stored in the vector database 131 become structured data, which are appropriate for the vector database 131 to perform similarity search.

Before the electronic device leaves the factory, the pre-stored token vectors TOKvec have been generated by the manufacturer and stored in the vector database 131. The vector database 131 could be set in the cloud or a storage module of the electronic device. Considering the storage space, the pre-stored token vectors TOKvec stored in the vector database 131 may be associated with only one version of the English user manual 18*a*. Alternatively, considering the data completeness, the pre-stored token vectors TOKvec stored in the vector database 131 may be associated with various versions of English user manuals 18*a*. This variation can be adopted optionally to meet various requirements.

When the user operates the electronic device and has trouble using an unfamiliar function of the electronic device, the user can make queries about the setting steps of operating the electronic device through the query platform 10. Since the electronic device may be sold to any country, the user probably uses a non-English language to make queries about the operating instructions. The disclosure refers to the query content being input by the user as a non-English query string qryTXT(usrLNG).

The language translator 11 of the query platform 10 first translates the non-English query string qryTXT(usrLNG) into an English query string qryTXT(eng), and then transmits the English query string qryTXT(eng) to the prompt tuning module 133, and the vector database 131. It is to be noted that the language translator 11, the prompt tuning module 133, and the pre-trained transformer 15 may adopt different types/numbers of inference accelerators. For example, the inference accelerators could be selected from neural network processing units (NPU), graphics processing units (GPU), field programmable gate arrays (FPGA), and so forth.

According to the English query string qryTXT(eng), the vector database 131 searches for one or more token vectors TOKvec_rel, which are highly related to the English query string qryTXT(eng), among the pre-stored token vectors TOKvec in the vector database 131.

According to concepts of the present disclosure, the vector database 131 can cooperate with a large language model (LLM). After steps of, for example, semantic search, similarity search, and recommendation engine are performed for the pre-stored token vectors TOKvec, at least one high-relevance token vector TOKvec_rel, which is determined more consistent with the queried operating instructions, is found. The one or more high-relevance token vectors TOKvec_rel obtained from the search by the vector database 131 are then transmitted to the prompt tuning module 133.

If the vector database 131 finds more high-relevance token vectors TOKvec_rel from the search, the vector database 131 may further sort the high-relevance token vectors TOKvec_rel according to the relevance levels. Then, the vector database 131 selects several (for example, three) high-relevance token vectors TOKvec_rel to be transmitted to the prompt tuning module 133 according to the sorting result.

In practical applications, the language translator 11 may transmit the non-English query string qryTXT(usrLNG) with metadata related to the model of the electronic device. In this way, after receiving the English query string qryTXT(eng) from the language translator 11, the vector database 131 can find more accurate high-relevance token vector(s) TOKvec_rel according to the metadata related to the model of the electronic device. For example, the queries from an esports gaming PC user (for example, information about adjusting and optimizing computer performance) are usually more complicated than those from a basic PC user (for example, information about word processing). Therefore, if the language translator 11 additionally transmits the metadata in the background, the vector database 131 can provide the high-relevance token vector(s) TOKvec_rel more accurately.

As described above, the prompt tuning module 133 receives the English query string qryTXT(eng) from the language translator 11 and receives the high-relevance token vector(s) TOKvec_rel from the vector database 131. The prompt tuning module 133 is a transformation model that performs natural language processing (NLP) based on machine learning technology. In short, the prompt tuning module 133 transforms the English query string qryTXT(eng) together with the high-relevance token vector(s) TOKvec_rel provided by the vector database 131 into an English interactive prompt string pptTXT(eng), which is more understandable by the pre-trained transformer 15.

The English interactive prompt string pptTXT(eng) could be regarded as the combination of the English query string qryTXT(eng) and the high-relevance token vector(s) TOKvec_rel. As described above, the high-relevance token vector(s) TOKvec_rel is derived from the English user manual 18*a* of the electronic device. Therefore, when describing a query condition, the English interactive prompt string pptTXT(eng) is obviously closer to the real situation of the electronic device than the English query string qryTXT(eng) obtained from the translation.

In practical applications, the prompt tuning module 133 could transmit the English interactive prompt string pptTXT(eng) with prefix-tuning or prompt-tuning, presented in the form of a question, to the pre-trained transformer 15. The pre-trained transformer 15 could be any known language model utilizing generative artificial intelligence, for example, GPT3.5, GPT-3.5 Turbo, GPT-4, or Llama 2.

The pre-trained transformer 15 makes inferences in response to the English interactive prompt string pptTXT(eng), and then generates an English reply string rTXT(eng) according to the inference result. After the pre-trained transformer 15 transmits the English reply string rTXT(eng) to the language translator 11, the language translator 11 translates the English reply string rTXT(eng) into a non-English reply string rTXT(usrLNG) to be provided to the user.

According to concepts of the present disclosure, the implementation and location of the query platform 10 could be determined according to the functions of the user's electronic device and are not limited herein. For example, when the user's electronic device is a high-end product, it means that the processor of the electronic device is very fast and the storage module has a large capacity. In this condition, the manufacturer can set the entire query platform 10 on the electronic device 20, as shown in FIG. 2.

Figure 2:
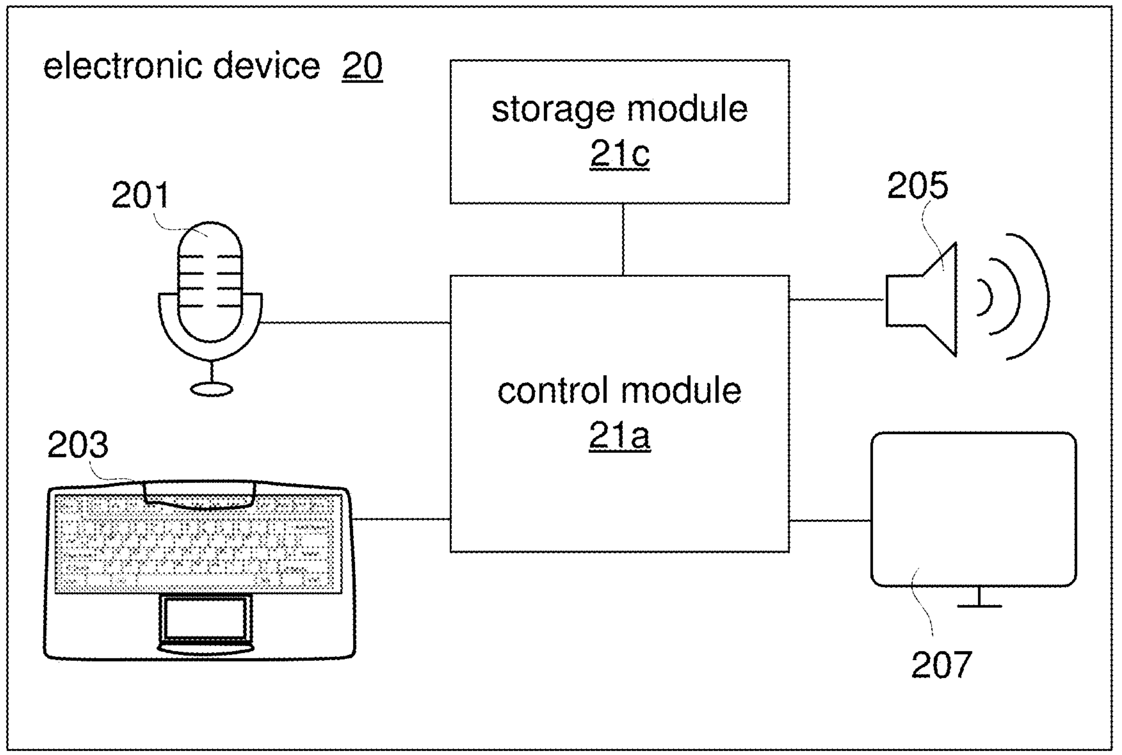
FIG. 2 is a schematic diagram showing that a query platform is set on an electronic device.

Please refer to FIG. 2, which is a schematic diagram showing that a query platform is set on an electronic device. The electronic device 20 includes a control module 21*a*, a storage module 21*c*, an input device (for example, a microphone 201 and a keyboard 203), and an output device (for example, a speaker 205 and a display 207). In FIG. 2, it is assumed that the electronic device 20 is a higher-end product. Therefore, the control module 21*a* has a faster processing speed, and the storage module 21*c* has a larger capacity. Thus, the electronic device 20 can be directly used to execute the query platform 10. For example, the control module 21*a* may include one or more central processing units (CPU), one or more graphics processors, or a combination thereof.

According to concepts of the present disclosure, the way that the non-English query string qryTXT(usrLNG) is input to the query platform 10 is not limited. For example, the user can input by typing, handwriting or voice. Accordingly, depending on the input means for the non-English query string qryTXT(usrLNG), the input device may be a keyboard 203, a touch panel, or a microphone 201. Suppose the non-English query string qryTXT(usrLNG) is input through a touch panel 203 or a microphone 201. In that case, the electronic device 20 may further include a component such as a handwriting recognition (HWR) module or a voice recognition module (not shown). Similarly, the output means for the non-English reply string rTXT(usrLNG) is not limited. For example, the query platform 10 can be displayed with a display 207 or played with a speaker 205. Whether it is displayed with the display 207 or played through the speaker 205, the query platform 10 replies in the user's familiar language usrLNG, by translating the non-English reply string rTXT(usrLNG) in advance to allow the user to realize the reply without the language barrier. It is to be noted that the types of input devices and output devices are not limited to these examples.

In FIG. 2, the storage module 21*c* is configured to store the vector database 131 and the database to be accessed by the pre-training transformer 15, and the control module 21*a* is configured to execute the functions of the language translator 11, the prompt tuning module 133 and the pre-trained transformer 15. The electronic device 20 adopting this architecture needs to load the settings of the query platform 10 before executing the query platform 10. Further, the queries through the query platform 10 adopting the architecture of FIG. 2 can be performed locally without a network connection and do not occupy network bandwidth. Therefore, the query platform 10 adopting the architecture of FIG. 2 requires a longer initial setup time, but faster query performance can be expected during the subsequent queries about the operating instructions.

Suppose the electronic device provided for querying the operating instructions is a low-end product. In that case, it means that the electronic device has a slower processing unit, and the storage module has a limited capacity. In this case, the manufacturer can set a portion or the entirety of the query platform 10 on a remote server. When the user wants to query the operating instructions related to the electronic device, the electronic device accesses the remote server through the network.

Figure 3:
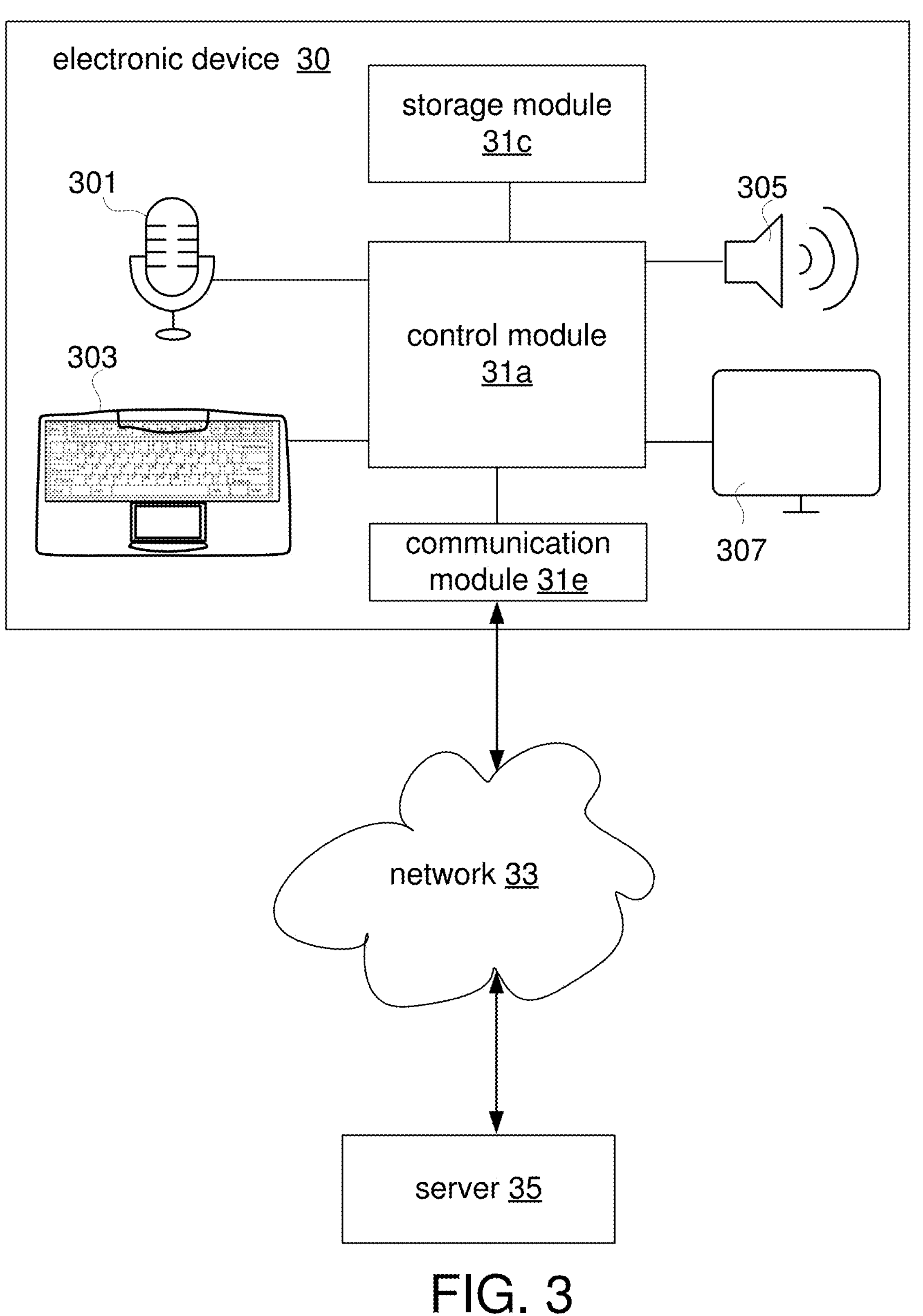
FIG. 3 is a schematic diagram showing that a query platform is provided by a server together with an electronic device.

Please refer to FIG. 3, which is a schematic diagram showing that a query platform is provided by a server together with the electronic device. The electronic device 30 includes a control module 31*a*, a storage module 31*c*, a communication module 31*e*, an input device (for example, a microphone 301 and a keyboard 303), and an output device (for example, a speaker 305 and a display 307). The control module 31*a* is electrically connected to the storage module 31*c*, the communication module 31*e*, the microphone 301, the keyboard 303, the speaker 305, and the display 307. Further, the communication module 31*e* is in signal communication with the server 35 in the cloud through the network 33.

In FIG. 3, the control module 31*a* communicates with an external server 35 through the communication module 31*e*. The control module 31*a* only needs to set up the connection with the server 35 at the initial setting, which requires a shorter initial setting time. However, subsequent queries about the operating instructions need signal transmission/reception through the network 33. Accordingly, the querying steps occupy network bandwidth, and a longer query time is required.

In practical applications, the manufacturer can set a part of the query platform 10 in the electronic device 30 and the other part of the query platform 10 in the cloud to reduce dependence on the network bandwidth. For example, one of the language translator 11, the semantic kernel module 13 and the pre-trained transformer 15 can be set on the electronic device 30, and the other two can be set on the server 35. Alternatively, two of the language translator 11, the semantic kernel module 13, and the pre-trained transformer 15 can be set on the electronic device 30, and the remaining one can be set on the server 35.

The manufacturer of the electronic devices 20 and 30 can determine the configuration of the query platform 10 based on the user's general operating habits. For example, after considering the execution of necessary or frequently-used software in the electronic device in most instances, if the manufacturer thinks that the available processor loading and storage space of the electronic device cannot support the operation of the query platform 10, the architecture of FIG. 3 is adopted, preferably.

It is to be noted that the single server 35 in this embodiment is given for illustrative purposes only. In practical applications, there may be one or more servers 35 used to implement the functions of the query platform 10, and the servers 35 could be colocated in a room or not.

In an embodiment, after considering execution of necessary or frequently-used software in the electronic device in most instances, the manufacturer may think that the available processor loading and storage space of the electronic device 30 can support execution of the language translator 11, but cannot further support execution of the semantic kernel module 13 and/or the pre-trained transformer 15 for performing the querying. In this condition, the language translator 11 can be set on the electronic device 30, and the semantic kernel module 13 and the pre-trained transformer 15 can be set in the cloud. The arrangement of which parts of the query platform 10 should be set on the electronic device 30 and which parts should be set on the server(s) is quite flexible and adjustable, and will not be described in detail herein.

Figure 4:
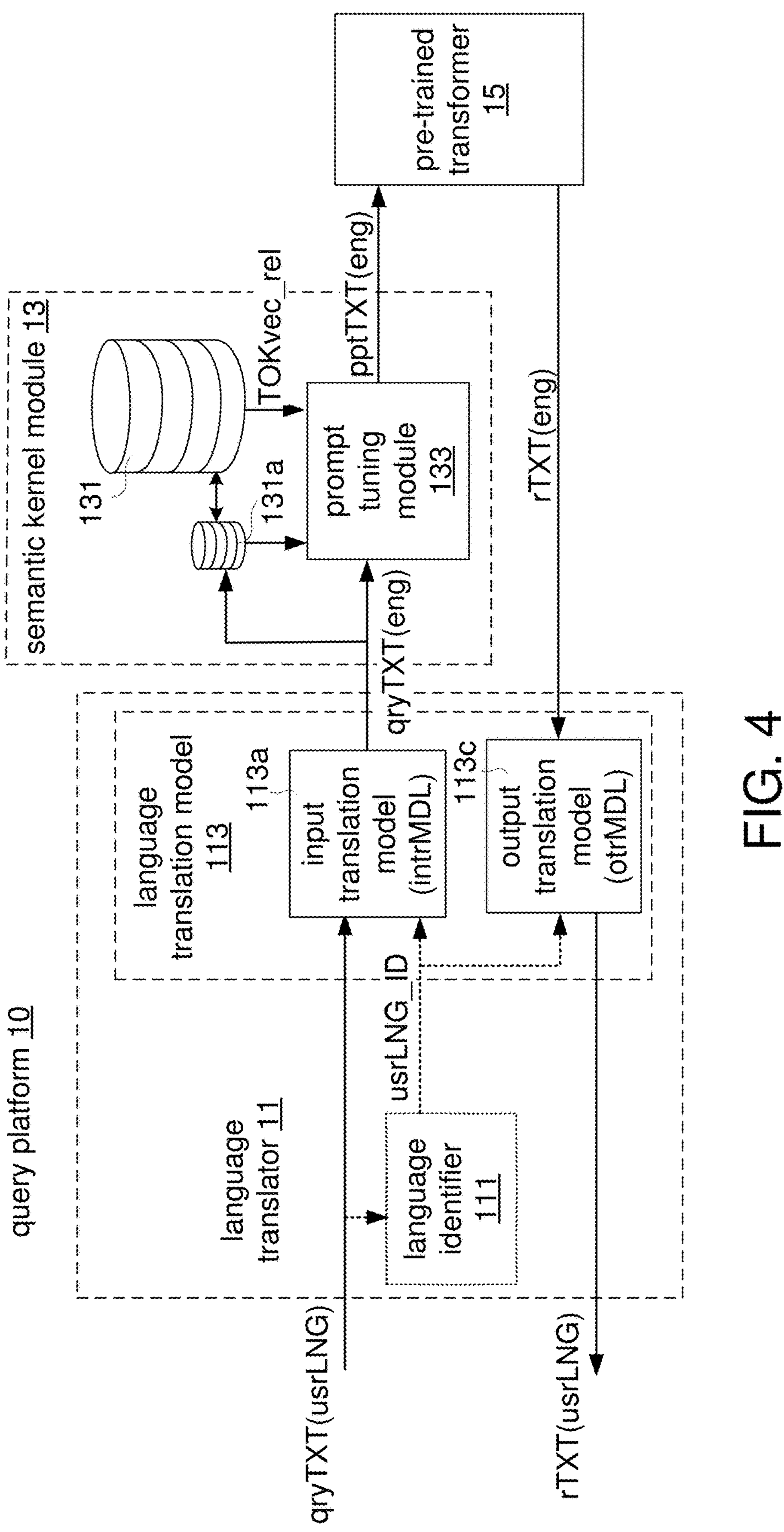
FIG. 4 is a functional block diagram showing data processing and transformation in an instruction query system according to an embodiment of the present disclosure.

Please refer to FIG. 4, which is a functional block diagram showing data processing and transformation in an instruction query system according to an embodiment of the present disclosure. This diagram is based on the architecture of FIG. 1 to illustrate the operations of the language translator 11 and the semantic core module 13. The connections between these components could be implemented by signal connections, electrical connections, or both, that is, signal connections for some connections and electrical connections for other connections.

As described above, the pre-stored token vectors TOKvec are created by the semantic parser 18*c* and the word vector model 18*g* and then stored in the vector database 131 before the electronic device 20/30 leaves the factory. Therefore, when the user operates the electronic device 20/30, no matter whether the query platform 10 adopts the architecture of FIG. 2 or FIG. 3, the user can use the query platform 10 on the electronic device 20/30 with no semantic parser 18*c* and word vector model 18*g* set thereon.

In addition to the vector database 131 and the prompt tuning module 133, the semantic kernel module 13 of the present disclosure could further include a vector data temporary storage module 131*a*. In short, the vector data temporary storage module 131*a* is regarded as a storage space for buffering. It is a specific or dedicated storage space for storing the high-relevance token vector(s) TOKvec_rel which is selected from the vector database 131 in response to a previous query.

In this way, when the user queries an operating instruction wherein a similar or related operating instruction has been queried before, the high-relevance token vector(s) TOKvec_rel can be retrieved from the vector data temporary storage module 131*a* without repetitively searching the vector database 131. For example, if the user has previously queried the resolution setting of the display, the vector data temporary storage module 131*a* may have recorded a high-relevance token vector TOKvec_rel associated with the string "resolution setting". Later, if the user wants to query the "dual monitors setting", the vector data temporary storage module 131*a*, instead of the vector database 131, can provide this recorded high-relevance token vector TOKvec_rel associated with the "display setting". The mechanism of optimizing or accelerating the search is not limited.

As shown in FIG. 4, the language translator 11 includes a language identifier 111 and a language translation model 113. The language translation model 113 further includes an input translation model intrMDL 113*a* and an output translation model otrMDL 113*c*.

After the user inputs the non-English query string qryTXT (usrLNG) through the input device, the non-English query string qryTXT(usrLNG) is transmitted to the language identifier 111 and the input translation model intrMDL 113*a*. The language identifier 111 is configured to identify and determine the user language usrLNG corresponding to the non-English query string qryTXT(usrLNG), and generate the language identification code usrLNG_ID accordingly. Then, the language identifier 111 transmits the language identification code usrLNG_ID to the input translation model intrMDL 113*a* and the output translation model otrMDL 113*c*.

The input translation model intrMDL 113*a* receives the non-English query string qryTXT(usrLNG) through the input device, and receives the language identification code usrLNG_ID from the language identifier 111. The input translation model intrMDL 113*a* translates the non-English query string qryTXT(usrLNG) into the English query string qryTXT(eng) according to the language identification code usrLNG_ID.

The input translation model intrMDL 113a transmits the English query string qryTXT(eng) to the vector data temporary storage module 131a and/or the vector database 131. If the vector data temporary storage module 131a has stored the high-relevance token vector(s) TOKvec_rel associated with the English query string qryTXT(eng), the high-relevance token vector(s) TOKvec_rel is provided by the vector data temporary storage module 131a. On the contrary, if the vector data temporary storage module 131a does not store any high-relevance token vector TOKvec_rel associated with the English query string qryTXT(eng), the input translation model intrMDL 113a and/or the vector data temporary storage module 131a transmits the English query string qryTXT(eng) to the vector database 131, which then determines the high-relevance token vector(s) TOKvec_rel according to the English query string qryTXT(eng).

Subsequently, the prompt tuning module 133 transforms the English query string qryTXT(eng) to the English interactive prompt string pptTXT(eng) based on the high-relevance token vector(s) TOKvec_rel. The English interactive prompt string pptTXT(eng) is more understandable by the pre-trained transformer 15. Afterward, the pre-trained transformer 15 makes inferences from the English interactive prompt string pptTXT(eng) to generate the English reply string rTXT(eng), and transmits the English reply string rTXT(eng) to the output translation model otrMDL 113c.

The output translation model otrMDL 113c receives the English reply string rTXT(eng) from the pre-trained transformer 15, and receives the language identification code usrLNG_ID from the language identifier 111. The output translation model otrMDL 113c translates the English reply string rTXT(eng) into the non-English reply string rTXT(usrLNG) according to the language identification code usrLNG_ID.

In practical applications, the language identifier 111 is optional. For example, the electronic device 20/30 provides a language menu to allow the user to select a preferred user language usrLNG. Alternatively, the language of the operating system running in the electronic device 20/30 is viewed as the default user language usrLNG. For these cases, the language identification code usrLNG_ID is a default value and need not be judged by the language identifier 111. Therefore, in FIG. 4, the language identifier 111 is represented by a dotted-line block, and the transmission path of the non-English query string qryTXT(usrLNG) to the language identifier 111 and the transmission path of the language identification code usrLNG_ID from the language identifier 111 are represented by dotted lines. Such modifications of the applications need not be described in detail herein.

Incidentally, if the user language usrLNG is English, the language translator 11 of the query platform 10 is not required in the query procedure. For example, the string being input through the input device could be treated as the English query string qryTXT(eng) and bypass the language translator 11. Also, the English reply string rTXT(eng) is directly output through the output device and bypasses the language translator 11. Such modifications of the applications are covered in the present disclosure.

Before the electronic device 20/30 leaves the factory, the manufacturer of the electronic device 20/30 uses the semantic parser 18c and the word vector model 18g to transform the content of the English user manual 18a into the pre-stored token vectors TOKvec in advance. Afterward, the pre-stored token vectors TOKvec are stored in the vector database 131. Depending on the specifications of the electronic device 20/30, the vector database 131 can be built into the electronic device 20 (local end), or set on the server 35. After the electronic device 20/30 leaves the factory, the query about the operating instructions is performed through the query platform 10 (FIG. 4) of the electronic device 20/30 and follows the steps shown in FIGS. 5A and 5B.

Figure 5A:
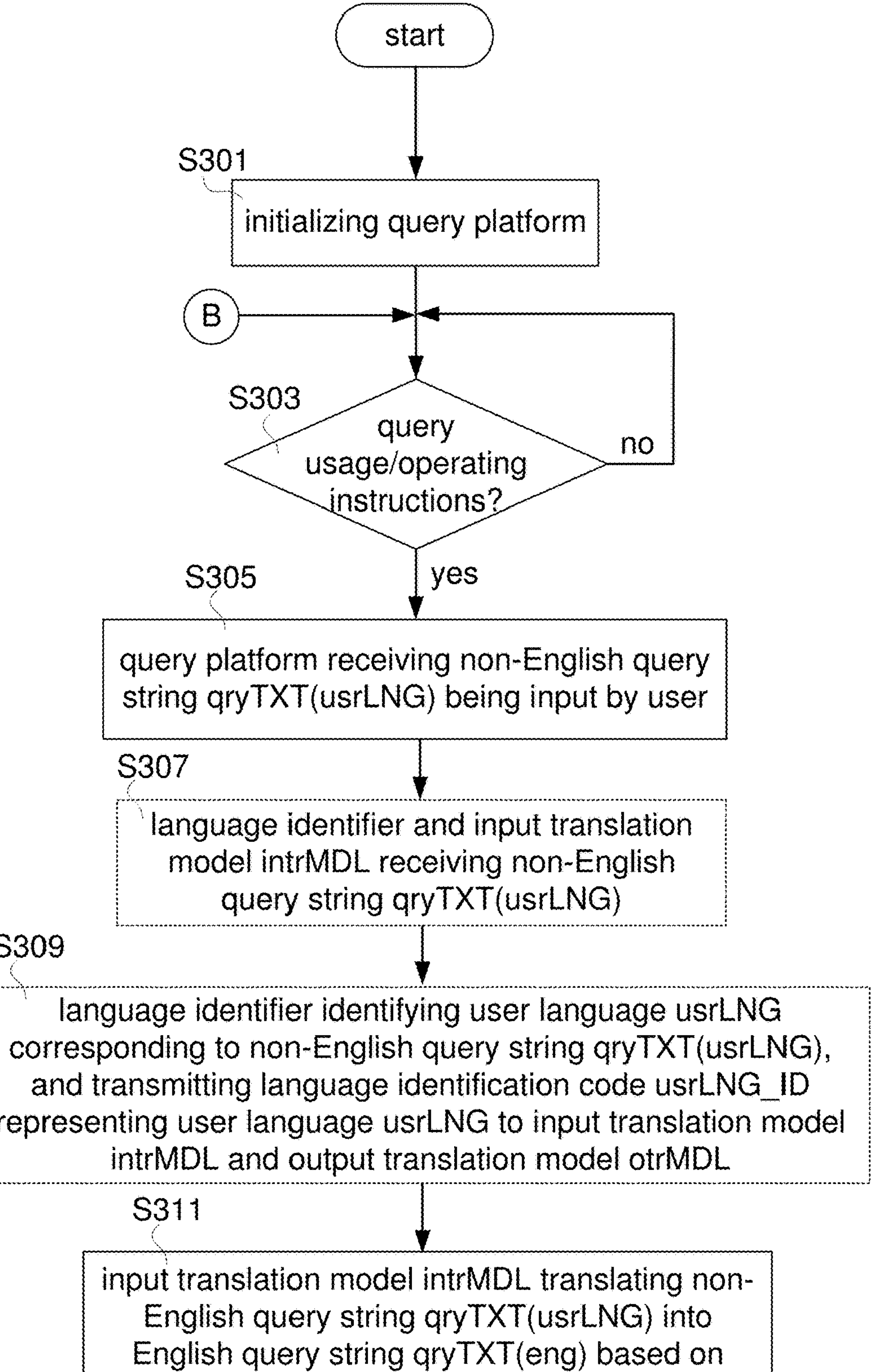
FIGS. 5A and 5B are flowcharts collectively showing an instruction query method according to an embodiment of the present disclosure.
Figure 5B:
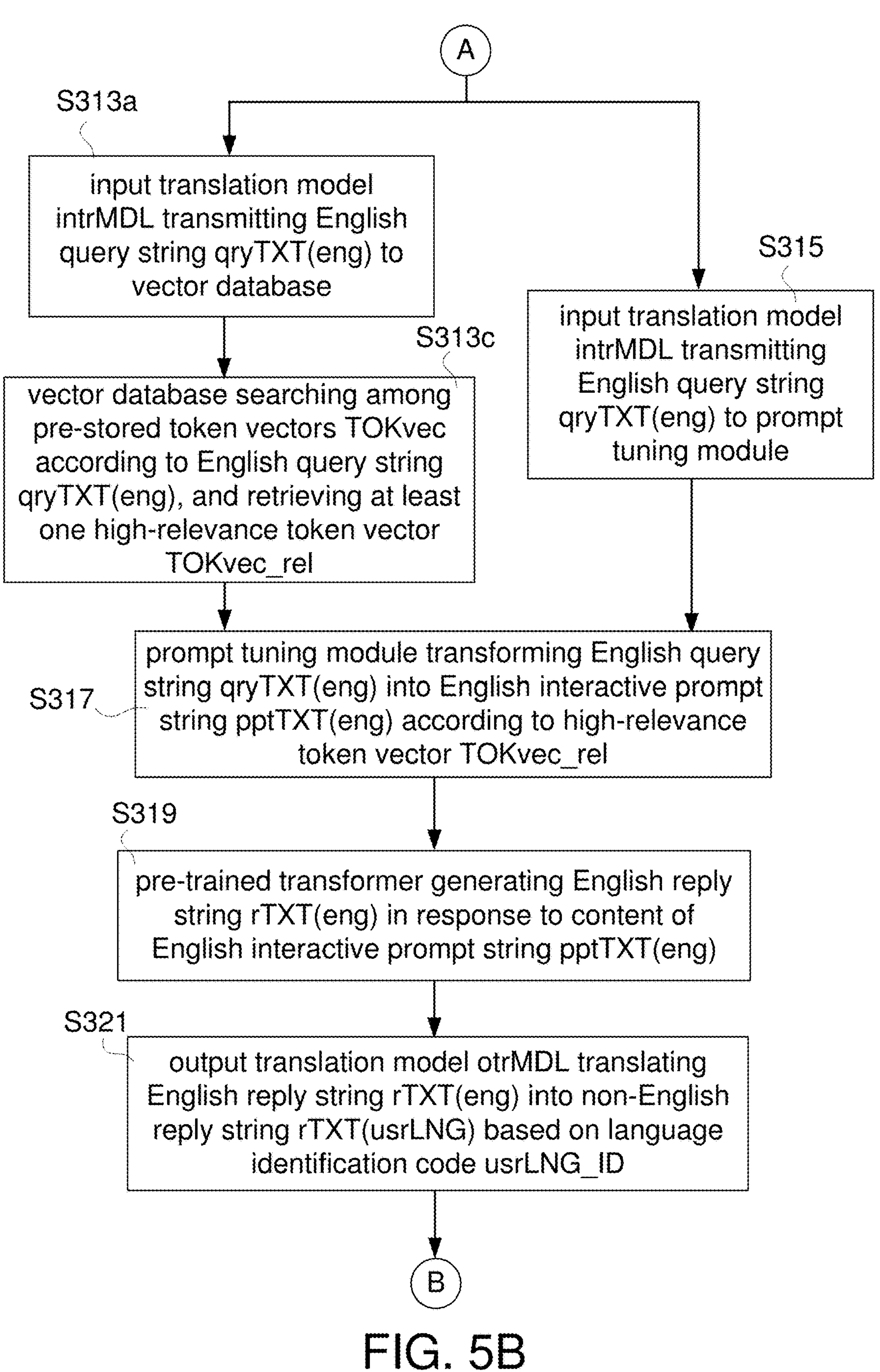

FIGS. 5A and 5B are flowcharts collectively showing an instruction query method according to an embodiment of the present disclosure. Please refer to FIGS. 4, 5A, and 5B for the illustrations. At first, when the electronic device 20/30 is just turned on, or the query platform 10 is just activated, the electronic device 20/30 initializes the query platform 10 (step S301). The initialization is defined as all steps required for establishing the environment for the query platform 10 after booting up the electronic device 20/30 until the user can start the query function. For example, the initialization may include setting the language translator 11, loading the language translator 11 in the semantic kernel module 13, activating and loading the vector database 131, establishing a connection with the pre-trained transformer 15, and so forth.

Next, the query platform 10 determines whether the user wants to query usage/operating instructions (step S303). If not, the method waits and then repeats the step S303. Otherwise, if the user wants to query the operating instructions related to the electronic device 20/30, the query platform 10 receives a non-English query string qryTXT(usrLNG) from the user through an input device (step S305).

After the language identifier 111 and the input translation model intrMDL 113a receive the non-English query string qryTXT(usrLNG) (step S307), the language identifier 111 identifies the user language usrLNG corresponding to the non-English query string qryTXT(usrLNG), and transmits a language identification code usrLNG_ID representing the user language usrLNG to the input translation model intrMDL and the output translation model otrMDL (step S309).

As mentioned above, in some applications, the user language usrLNG can be preset through the electronic device 20/30 and need not be determined by the language identifier 111. Therefore, steps S307 and S309, describing the actions of the language identifier 111, are optional rather than compulsory.

The input translation model intrMDL 113a translates the non-English query string qryTXT(usrLNG) into an English query string qryTXT(eng) based on the language identification code usrLNG_ID (step S311). The English query string qryTXT(eng) is sent to the vector database 131 and the prompt tuning module 133, respectively (step S313a and step S315).

After receiving the English query string qryTXT(eng), the vector database 131 searches among pre-stored token vectors TOKvec previously stored in the vector database 131 according to the English query string qryTXT(eng). After searching among the pre-stored token vectors TOKvec, the vector database 131 retrieves at least one high-relevance token vector TOKvec_rel (step S313c).

The prompt tuning module 133 transforms the English query string qryTXT(eng) into an English interactive prompt string pptTXT(eng) according to the high-relevance token vector(s) TOKvec_rel retrieved by the vector database 131 (step S317). The pre-trained transformer 15 generates an English reply string rTXT(eng) in response to the content of the English interactive prompt string pptTXT(eng) (step S319). The output translation model otrMDL 113c translates the English reply string rTXT(eng) into a non-English reply string rTXT(usrLNG) based on user language usrLNG according to the language identification code usrLNG_ID (step S321). The electronic device 20/30 outputs the content of the non-English reply string rTXT(usrLNG) to the user through voice playback or screen display. Afterward, the query platform 10 determines again whether the user wants to query other usage/operating instructions (step S303).

In conclusion, the instruction query system 1 of the present disclosure can generate the non-English reply string rTXT(usrLNG) in the user's familiar language, which is identified from the non-English query string qryTXT (usrLNG) being input by the user. Hence, the user can always face an operating interface presented with the user's familiar language. Further, the content of the non-English reply string rTXT(usrLNG) generated by the instruction query system 1 is derived from the content of the English user manual 18*a*. Therefore, the non-English reply string rTXT(usrLNG), which the user reads or listens to, indeed gives direct and concrete operating instructions guiding the usage/operation of the electronic device 20/30.

The instruction query method, according to concepts of the present disclosure, can be implemented by a software program stored in a computer program product or a computer-readable medium. For a user who is not familiar with the usage/operation of the electronic device 20/30, he/she can use his/her familiar language to query the operating instructions. Further, the reply from the query platform 10 is derived from the content of the English user manual 18*a* related to the electronic device 20/30 so that the replied suggestion will not be vague or inaccurate. On the other hand, for the manufacturer of the electronic device 20/30, there is no need to prepare user manuals in different languages for worldwide users in different countries. It significantly reduces the production costs.

In practical applications, the instruction query method of the present disclosure can be applied to various kinds of electronic devices, such as mobile phones, tablets, desktop computers, and notebook computers. Which electronic device can work with the instruction query method of the present disclosure is just a simple choice of those skilled in the art.

Those of ordinary skill in the art should understand that in the above description, the various logical blocks, modules, circuits, and steps taken as examples can be implemented by electronic hardware, computer software, or a combination thereof. The connections, regardless of being expressed as signal connections, connections, communication, coupling, electrical connections, or the like, represent that signal/data/information exchange or transmission for implementing the logical blocks, modules, circuits, and steps can be achieved through wired electronic signals, wireless electromagnetic signals or optical signals directly or indirectly. The terms used in the description do not limit the connection type of the present disclosure, and altering the connection type will not deviate from the scope of the present disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An instruction query method, comprising steps of:

performing, by a semantic parser, sentence decomposition and token splitting on at least one English document to generate at least one JavaScript Object Notation file, wherein the at least one English document records operating instructions of an electronic device;

performing, by a word vector model, data vectorization on the at least one JavaScript Object Notation file to generate a plurality of pre-stored token vectors;

storing, by a vector database, the pre-stored token vectors;

translating, by a language translator, a non-English query string into an English query string according to a language identification code;

searching, by the vector database, among the pre-stored token vectors according to the English query string to obtain at least one high-relevance token vector;

receiving, by a prompt tuning module, the English query string from the language translator, and the at least one high-relevance token vector from the vector database;

transforming, by the prompt tuning module, the English query string into an English interactive prompt string according to the at least one high-relevance token vector, wherein the at least one high-relevance token vector relates to the operating instructions of the electronic device; and translating, by the language translator, an English reply string into a non-English reply string according to the language identification code, wherein the English reply string is generated based on inferences made from the English interactive prompt string.

2. The instruction query method according to claim 1, wherein the English reply string is generated by a pre-trained transformer based on the inferences made from the English interactive prompt string.

3. The instruction query method according to claim 1, further comprising a step of:

transmitting, by the language translator, metadata related to a model of the electronic device to the vector database, wherein the vector database searches among the pre-stored token vectors according to the metadata and the English query string to obtain the at least one high-relevance token vector.

4. The instruction query method according to claim 1, further comprising a step of:

storing the obtained at least one high-relevance token vector into a vector data temporary storage module.

5. The instruction query method according to claim 1, further comprising a step of:

identifying, by the language translator, a language corresponding to the non-English query string to generate the language identification code.

6. The instruction query method according to claim 1, wherein the language identification code is a default code.

7. The instruction query method according to claim 1, wherein the electronic device comprises an input device generating and transmitting the non-English query string to the language translator in response to a user input.

8. The instruction query method according to claim 7, wherein the language identification code represents a language corresponding to the user input.

9. The instruction query method according to claim 1, wherein the electronic device comprises an output device outputting the non-English reply string received from the language translator.

* * * * *